United States Patent Office 2,746,964
Patented May 22, 1956

2,746,964

DICARBOXYLIC ACID ESTERS OF N-ALKYL-3-HYDROXYPIPERIDINE AND SALTS THEREOF

John H. Biel, Milwaukee, Wis., assignor to Lakeside Laboratories, Inc., a corporation of Wisconsin No Drawing. Application November 2, 1953, Serial No. 389,847

12 Claims. (Cl. 260—294.3)

This invention relates to the dicarboxylic acid esters of N-alkyl-3-hydroxypiperidine and the salts thereof.

I have discovered and synthesized a group of new and superior anti-spasmodic compounds, the therapeutic action of which is analogous to curare. The new compounds of this invention may be designated generally as the dicarboxylic acid esters of N-alkyl-3-hydroxypiperidine and the salts thereof. The dicarboxylic acid esters of N-alkyl-3-hydroxypiperidine have the following structural formula:

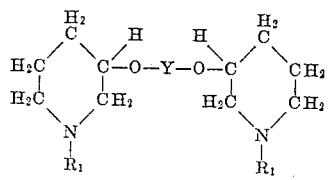

wherein $R_1$ is a lower alkyl or an aralkyl radical in which the aryl is phenyl and the alkyl group of the aralkyl radical is a lower alkyl, and Y is a saturated or an unsaturated dicarboxylic acid radical.

The salts of the above compounds have the following structural formula:

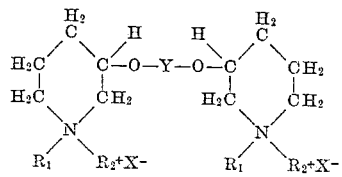

wherein $R_1$ is a lower alkyl or an aralkyl radical in which the aryl is phenyl and the alkyl group of the aralkyl radical is a lower alkyl; $R_2$ is hydrogen, a lower alkyl or an aralkyl radical in which the aryl is phenyl and the alkyl group of the aralkyl radical is a lower alkyl; Y is a saturated or unsaturated dicarboxylic acid radical having from 2 through 10 carbons; and X is the negative ion of a non-toxic acid. By a non-toxic acid I mean one that is non-toxic when taken in therapeutic dosages.

It is to be noted that the salts may be the acid addition and quaternary ammonium salts which are generally soluble in water. Therefore, they constitute a preferred form of the invention.

Salts of the compounds which comprise this invention may be prepared by reacting the basic dicarboxylic acid esters of N-alkyl-3-hydroxypiperidine with non-toxic acids or the esters thereof. Examples of the salts which may be prepared include halide, sulfate, phosphate, tartrate, benzoate, acetate, cinnamate, mandelate, succinate, citrate, and the like.

The esters are prepared by the condensation of a dicarboxylic acid chloride with N-alkyl-3-hydroxypiperidine in the presence of triethylamine. Due to the presence of two asymmetric carbon atoms in the case of the dibasic esters, two racemic forms (diastereoisomers) of different melting points are obtained. The following examples serve to illustrate the above invention:

Example 1

A. Di-(N-methyl-3-piperidyl)-succinate and its dimethobromide salt, having the structural formulae:

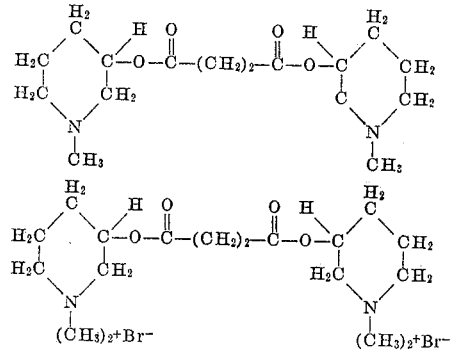

To 23.0 g. (0.20 mole) of N-methyl-3-hydroxypiperidine, and 25.0 g. (0.25 mole) triethylamine in 100 cc. of benzene was added with stirring and cooling 15.5 g. (0.10 mole) of succinyl chloride. The mixture was allowed to stir at room temperature for twenty hours and then refluxed for four hours. The reaction mixture was clarified by filtrations. The filtrate was distilled in vacuo and the product collected at 151–152° C. (0.05 mm.); yield 18 g. (58%).

Anal.—Calcd. for $C_{16}H_{28}N_2O_4$: N, 8.98. Found: N, 8.86.

To 12.0 g. (0.039 mole) of the basic ester contained in 50 cc. of isopropyl alcohol was added 7.4 g. (0.078 mole) of methyl bromide. The mixture was allowed to stand at 30° C. for 2 days and the precipitate collected by filtration; yield 4.4 g., M. P. 164° C. with decomposition.

Anal.—Calcd. for $C_{18}H_{34}Br_2N_2O_4$: Br, 31.88; N, 5.57. Found: Br. 31.80; N, 5.65.

The filtrate obtained from the above preparation was allowed to stand for one day at room temperature and a white, crystalline precipitate appeared which was collected by filtration; yield 11.2 g., M. P. 145–147° C.; yield 11.2 g.

Anal.—Calcd. for $C_{18}H_{34}Br_2N_2O_4$: Br, 31.88; N, 5.57. Found: Br, 31.72; N, 5.56.

Other new compounds prepared essentially by the same method as set forth in Example I have the following structural formulae:

B. Di(N-ethyl-3-piperidyl)-sebacate, its hydrochloride and dibenzylbromide salts.

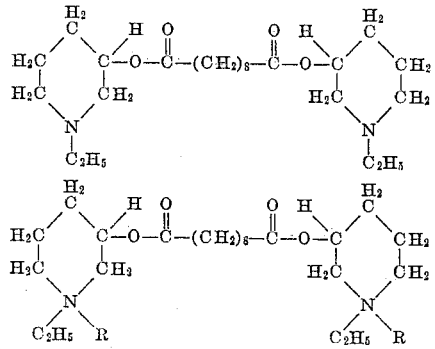

wherein R was HCl and $CH_2\phi Br$ for the hydrochloride and dibenzylbromide salts, respectively.

C. Di(N-2'-phenylethyl-3-piperidyl)-succinate; its hydrochloride and dimethobromide salts.

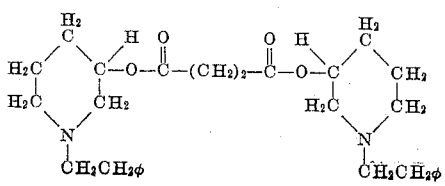

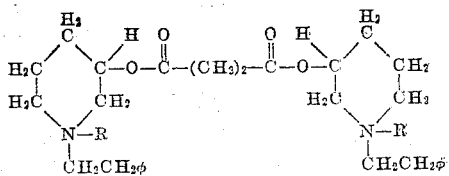

wherein R was HCl and CH₃Br for the hydrochloride and dimethyl bromide salts, respectively.

Example II

Di-(N-methyl-3-piperidyl) maleate and its dimethobromide salt, having the structural formulae:

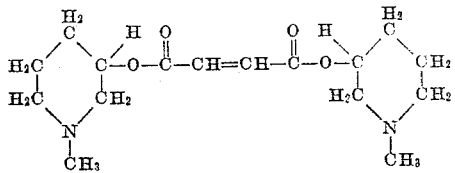

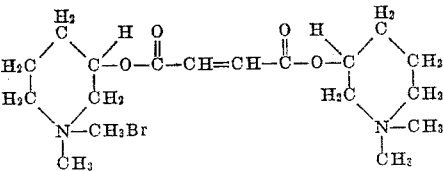

A mixture containing 36.0 gm. (0.25 mole) of dimethyl-maleate, 57.5 g. (0.50 mole) of N-methyl-3-hydroxypiperidine, 1.25 g. sodium methoxide in 500 cc. of n-heptane was refluxed with stirring and the methanol separated in a Dean-Stark separator. The reaction mixture was clarified by filtration, the heptane removed from filtrate by distillation and the residual liquid fractionated by distillation in vacuo, yield 20.6 g. (27%), B. P. 163–165° C.

*Anal.*—Calcd. for C₁₆H₂₆N₂O₄: N, 9.03. Found: N, 8.81.

Into a solution containing 14 g. (0.045 mole) of the basic diester in 50 cc. isopropyl alcohol was passed 8.5 g. (0.090 mole) of methyl bromide. The white, crystalline precipitate was separated by filtration and washed with isopropyl alcohol, yield 15 g. (67%), M. P. 248–250° C.

*Anal.*—Calcd. for C₁₈H₃₂Br₂N₂O₄: Br, 32.00; N, 5.60. Found: Br, 31.82; N, 5.47.

Example III

Di(N-methyl-3-piperidyl)-oxalate and its dimethobromide salt; having the structural formulae:

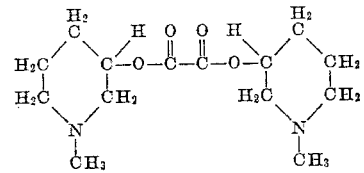

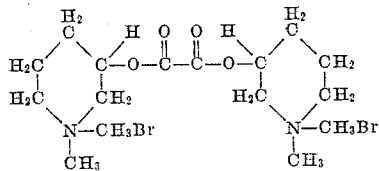

To 23.0 g. (0.20 mole) of N-methyl-3-hydroxypiperidine, 24.0 g. (0.24 mole) triethylamine in 100 cc. of benzene was added dropwise with cooling to 40–50° C. 12.7 g. (0.10 mole) oxalkyl chloride dissolved in 50 cc. benzene. The mixture was stirred at room temperature for three hours and then refluxed for two hours. Triethylamine hydrochloride was removed by filtration and washed with benzene. The filtrate was fractionated and the product collected at 145–148° C. (0.12 mm.), yield 12 g. (42%).

*Anal.*—Calcd. for C₁₄H₂₄N₂O₄: N, 9.87. Found: N, 9.30.

To 11.0 g. (0.39 mole) of the basic diester dissolved in 75 cc. of isopropyl alcohol was added 15 g. (0.16 mole) of methyl bromide and the mixture allowed to stand at room temperature. The white, crystalline precipitate was washed with isopropyl alcohol, yield 5.0 g. (27%); M. P. 298–299° C. dec.

*Anal.*—Calcd. for C₁₆H₃₀Br₂N₂O₄: Br, 33.75; N, 5.92. Found: Br, 34.55; N, 6.38.

Example IV

Di-(N-methyl-3-piperidyl) malonate and its dimethobromide salt, having the structural formulae:

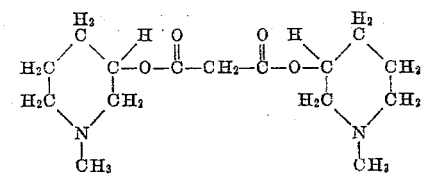

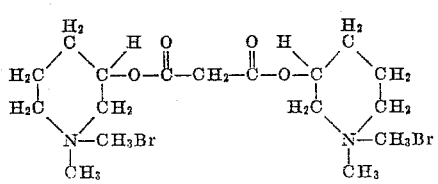

A mixture containing 26.4 g. dimethyl malonate, 46.0 g. (0.40 mole) N-methyl-3-hydroxypiperidine and 0.7 g. sodium methoxide in 250 cc. of n-heptane was stirred and refluxed for 4 hours and the methanol collected in a Dean-Stark separator. The reaction mixture was clarified by filtration and the filtrate fractionated by distillation. The product was collected at 173–182° C. (1.0–1.5 mm.), yield 21.3 g. (35%).

*Anal.*—Calcd. for C₁₅H₂₆N₂O₄: N, 9.40. Found: N, 9.20.

To 14.0 g. (0.047 mole) of the basic diester dissolved in 60 cc. isopropyl alcohol was added 9.0 g. (0.094 mole) methyl bromide. The mixture was allowed to stand at room temperature. A yellow oil precipitated which was ether insoluble, water soluble and gave a test for ionic bromide. The oily product, however, did not yield to crystallization.

Example V

Di-(N-methyl-3-piperidyl)-sebacate and its dimethobromide salt, having the structural formulae:

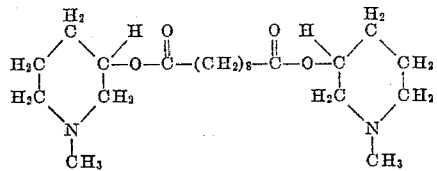

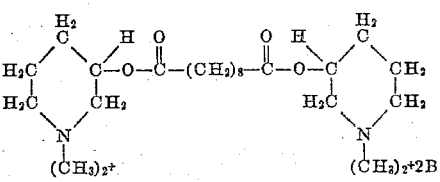

In a 500 ml. 3-necked round bottomed flask equipped with a mechanical stirrer, reflux condenser, with a potassium hydroxide drying tube, dropping funnel, thermometer and mantle, place 23.0 g. (0.2 M) N-methyl-3-hydroxy piperidine, 100 ml. anhydrous toluene, and 14.2 g. (0.24 M) triethyl amine. Add dropwise with stirring 23.9 g. (0.1 M) sebacyl dichloride and 100 ml. anhydrous toluene, then stir and reflux the cream colored suspension for 1.25 hours. Filter while hot, remove toluene in vacuo and distill residue. B.=203–206° (0.035 mm.), 21.8 g., 55.1% yield.

*Anal.*—Calcd. for C₂₂H₄₀N₂O₄: N, 7.07. Found: N, 7.08.

To 3.9 g. (0.01 M) di-(N-methyl-3-piperidyl) sebacate dissolved in 50 ml. acetone was added 2.1 g. (0.022 M) methyl bromide and the mixture stored at room temperature. A white oil formed which crystallized on standing overnight. The crystals were collected by anhydrous filtration. M. P. 180–183° (decomposed to yellow liquid). Hygroscopic solid, 2.41 g., 41.0% yield.

*Anal.*—Calcd. for C₂₄H₄₆Br₂N₂O₄: Br, 27.30; N, 4.77. Found: Br, 27.00; N, 5.06.

The foregoing detailed description is given for clearness of understanding only and no unnecessary limitations are to be understood therefrom, for some modifications will be obvious to those skilled in the art.

I claim:
1. A member of the group consisting of (a) the basic esters of the formula:

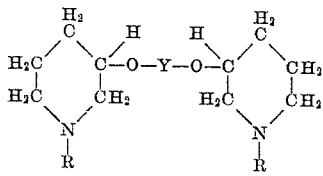

wherein R is a member of the class consisting of lower alkyl and aralkyl radicals in which the aryl is phenyl and the alkyl group of the aralkyl radical is a lower alkyl, and Y is a member of the class consisting of saturated and unsaturated dicarboxylic radicals having from 2 through 10 carbons; (b) acid addition salts thereof; and (c) quaternary ammonium salts thereof.

2. A salt of a basic ester of the formula:

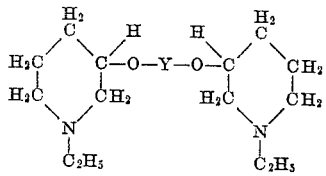

wherein Y is a saturated dicarboxylic acid radical having from 2 through 10 carbons.

3. The composition of claim 2 wherein Y is a sebacic acid radical.

4. A salt of a basic ester of the formula:

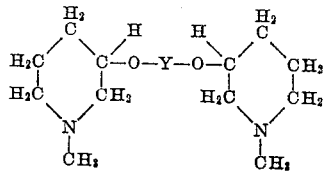

wherein Y is an unsaturated dicarboxylic acid radical having from 2 through 10 carbons.

5. The composition of claim 4 wherein Y is a maleic acid radical.

6. A salt of a basic ester of the formula:

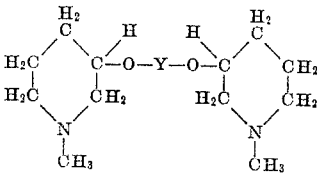

wherein Y is a saturated dicarboxylic acid radical having from 2 through 10 carbons.

7. The composition of claim 6 wherein Y is an oxalic acid radical.

8. The composition of claim 6 wherein Y is a malonic acid radical.

9. The composition of claim 6 wherein Y is a succinic acid radical.

10. The composition of claim 6 wherein Y is a sebacic acid radical.

11. A salt of a basic ester of the formula:

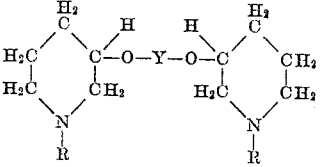

wherein R is an aralkyl radical in which the aryl is phenyl and the alkyl group of the aralkyl radical is a lower alkyl and Y is a saturated dicarboxylic acid radical having from 2 through 10 carbons.

12. The composition of claim 11 wherein R is phenylethyl and Y is a succinic acid radical.

References Cited in the file of this patent

UNITED STATES PATENTS

| | | |
|---|---|---|
| 2,477,937 | Paul et al. | Aug. 2, 1949 |
| 2,533,003 | Feldkamp | Dec. 5, 1950 |

FOREIGN PATENTS

| | | |
|---|---|---|
| 585,729 | Great Britain | Feb. 21, 1947 |

OTHER REFERENCES

Paul: Compt. rend. (Fr. Acad.), vol. 221, No. 15, pp. 412–14 (1905).

Paul: Compt. rend. (Fr. Acad.), vol. 221, pp. 560–62 (1945).

Berger et al.: Chem. Abst., vol. 45, col. 265 (1951).

Chen et al.: Chem. Abst., vol. 46, col. 6263 (1952).